US011113561B2

(12) United States Patent
Diego Andilla et al.

(10) Patent No.: US 11,113,561 B2
(45) Date of Patent: Sep. 7, 2021

(54) METHOD, ARTIFICIAL NEURAL NETWORK, DEVICE, COMPUTER PROGRAM AND MACHINE-READABLE MEMORY MEDIUM FOR THE SEMANTIC SEGMENTATION OF IMAGE DATA

(71) Applicant: ROBERT BOSCH GMBH, Stuttgart (DE)

(72) Inventors: Ferran Diego Andilla, Barcelona (ES); Dimitrios Bariamis, Hildesheim (DE); Masato Takami, Hildesheim (DE); Uwe Brosch, Hohenhameln (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 16/590,905

(22) Filed: Oct. 2, 2019

(65) Prior Publication Data
US 2020/0110960 A1    Apr. 9, 2020

(30) Foreign Application Priority Data
Oct. 5, 2018   (DE) .......................... 102018217091.6

(51) Int. Cl.
*G06K 9/46*    (2006.01)
*G06K 9/62*    (2006.01)
*G06N 3/08*    (2006.01)

(52) U.S. Cl.
CPC ......... *G06K 9/4638* (2013.01); *G06K 9/4633* (2013.01); *G06K 9/6286* (2013.01); *G06N 3/08* (2013.01)

(58) Field of Classification Search
None
See application file for complete search history.

(56) References Cited

U.S. PATENT DOCUMENTS

| 2014/0172643 A1* | 6/2014 | Fazl Ersi ............ G06F 16/5854 705/26.64 |
| 2020/0026942 A1* | 1/2020 | Jiang ........................ G06N 3/04 |
| 2020/0410674 A1* | 12/2020 | Koch ................... A61B 5/4504 |

OTHER PUBLICATIONS

Kayalibay, B., Jensen, G., & van der Smagt, P. (2017). CNN-based segmentation of medical imaging data. arXiv preprint arXiv: 1701.03056. (Year: 2017).*

Shelhamer et al., "Fully Convolutional Networks for Semantic Segmentation," arXiv:1605.06211 (2016).

(Continued)

*Primary Examiner* — Fayyaz Alam
(74) *Attorney, Agent, or Firm* — Norton Rose Fulbright US LLP; Elizabeth Tretter

(57) ABSTRACT

Method for the calculation resource-saving semantic segmentation of image data of an imaging sensor with the aid of an artificial neural network, in particular, of a convolutional neural network, the artificial neural network including an encoder path, a decoder path, the encoder path transitioning into the decoder path, the transition taking place via a discriminative path, the following steps taking place in the discriminative path: dividing an input tensor as a function of a division function into at least one first slice tensor and at least one second slice tensor, the input tensor originating from the encoder path; connecting the at least one first slice tensor to the at least one second slice tensor as a function of a connection function in order to obtain a class tensor; and outputting the class tensor to the decoder path of the neural network.

15 Claims, 4 Drawing Sheets

(56) References Cited

OTHER PUBLICATIONS

Olaf Ronneberger, Philipp Fischer, Thomas Brox. U-Net: Convolutional Networks for Biomedical Image Segmentation. Medical Image Computing and Computer-Assisted Intervention (MICCAI), Springer, LNCS, vol. 9351.

Zhang, et al.: "Split-Brain Autoencoders: Unsupervised Learning by Cross-Channel Prediction", BAIR Lab., Proceedings of the IEEE Conf. on Computer Vision and Pattern Recognition (2017), pp. 1058-1067.

\* cited by examiner

METHOD, ARTIFICIAL NEURAL NETWORK, DEVICE, COMPUTER PROGRAM AND MACHINE-READABLE MEMORY MEDIUM FOR THE SEMANTIC SEGMENTATION OF IMAGE DATA

FIELD OF THE INVENTION

The present invention relates to a method for the semantic segmentation of image data. The present invention also relates to a related artificial neural network, a device, a computer program, and a machine-readable memory medium (computer readable medium).

BACKGROUND INFORMATION

"Evan Shelhamer, Jonathan Long, Trevor Darrell. Fully Convolutional Models for Semantic Segmentation. PAMI 2016." describes an advancement of convolutional neural networks. Convolutional neural networks are strong artificial neural networks for processing visual data, which are able to create a semantic feature hierarchy of the visual data. The publication describes the approach of using a "Fully Convolutional Network", which is able to receive input data of an arbitrary amount and to output an output corresponding in size with efficient derivation of the features.

"Olaf Ronneberger, Philipp Fischer, Thomas Brox. U-Net: Convolutional Networks for Biomedical Image Segmentation. Medical Image and Computer-Assisted Intervention (MICCAI), Springer, LNCS, Vol. 9351" describes an architecture of an artificial neural network and a training strategy for this network, which is based on the utilization of expanded (augmented) training data in order to utilize the existing annotated examples more efficiently. The architecture of the network includes a "contracting path" (encoder path) and for detecting the context of the input data and symmetrically thereto an "expanding path" (decoder path), which enables a precise location of the detected image features. This artificial neural network may be trained using a comparably small number of training data.

SUMMARY OF THE INVENTION

Artificial neural networks, in particular, so-called convolutional neural networks (CNN), for semantically segmenting image data, in particular for localizing and classifying objects in image data, include a high demand for calculation resources. As a result of the addition of a decoder component or upsampling component, with which the image data are restored to their original resolution after the semantic analysis in the encoder component, the demand for calculation resources continues to drastically increase. In some implementations, this may result in an exponential increase in the demand for calculation resources.

In addition to the increase in the demand for calculation resources, a semantic segmentation of image data on a pixel basis requires more memory resources when using artificial neural networks, in particular, when using CNN, i.e., more memory bandwidth, memory accesses and memory space during the training phase and during the use of the network.

The disadvantage of this additional demand for calculation resources, memory bandwidth, memory accesses and memory space increases as soon as the application does not take place on memory-intensive and spread-calculating special processing units, such as graphical processing units clusters (GPU clusters), but is to run on embedded processing units, such as embedded hardware or the like.

It is against this background that the present invention puts forth a method, an artificial neural network, a device, a computer program and a machine-readable memory medium for semantically segmenting image data of an imaging sensor.

Image data in the present case may be understood to mean data of an imaging sensor. These are primarily understood to mean the data of a video sensor, therefore of a camera. Due to the similarity of the data, it is equally possible to process data of a radar sensor, an ultrasonic sensor, a LIDAR sensor or the like as image data with the aid of the present invention. With regard to the present invention, therefore, radar sensors, ultrasonic sensors, LIDAR sensors or the like may be understood to mean imaging sensors.

Of particular importance for this invention are image data of an imaging sensor suitable for use in a vehicle or the like, therefore, an automotive image sensor.

Semantic segmentation is understood in the present case to mean the processing of image data, with the aim of ascertaining the semantic classes of the objects contained in the image as well as their location in the image. In this case, it should be noted that pieces of global information in the image permit conclusions to be drawn about the semantic class of the objects, whereas local information in the image permits conclusions to be drawn about the localization of the objects in the image.

One aspect of the present invention is a method for semantically segmenting image data with the aid of an artificial neural network, in particular, of a convolutional neural network (CNN).

The artificial neural network includes an encoder path for ascertaining the semantic classes in the image data and a decoder path for localizing the ascertained classes in the image data. A discriminative path is situated in the transition between the encoder path and the decoder path. The method includes the steps in the discriminative path:

dividing an input tensor as a function of a division function into at least one first slice tensor and at least one second slice tensor, the input tensor originating from the encoder path.

connecting the at least one first slice tensor to the at least one second slice tensor as a function of a first connection function in order to obtain a class tensor.

connecting the at least one second slice tensor to the class tensor as a function of a second connection function in order to obtain a decoder tensor.

outputting the decoder tensor to the decoder path of the neural network.

An artificial neural network is understood in the present case to mean a network made up of artificial neurons for processing information, for example, for processing image data, in particular, for localizing and classifying objects in image data.

A convolutional neural network (CNN) is understood in the present case to mean a class of artificial neural networks considered to be "state of the art" in the field of classification. The basic structure of a CNN is made up of an arbitrary sequence of convolutional layers and pooling layers, which are enclosed by one or by multiple fully-connected layer(s). Each of the layers is constructed of artificial neurons.

An encoder path is understood in the present case to mean a path of processing of the image data up to the classification of objects in the image data.

A decoder path is understood in the present case to mean a path, which follows the encoder path and, based on the classification, restores the original image data for localizing the classified objects.

A discriminative path is understood in the present case to mean the transition area between the encoder path of an artificial neural network and a decoder path of an artificial neural network. This involves the deepest section of the architecture or of the structure of an artificial neural network, in particular, of an artificial neural network according to the convolutional neural network (CNN) architecture.

A tensor is understood in the present case to mean a data representation during the processing in an artificial neural network. The data set includes a processed version of the image data and associated feature maps. A tensor at level 1 of the i-st step in an artificial neural network is typically represented as $x_i^1 \in R^{n \times m \times f}$ having n rows, m columns and f feature maps.

An input tensor is a data representation prior to the processing by the method of the present invention. The input tensor according to the present invention originates from the encoder path of an artificial neural network, in particular, of an artificial neural network according to the convolutional neural network architecture. This means, the input tensor is the result of the processing of the original image data in the encoder path of the artificial neural network.

A slice tensor is a data representation after the step of dividing according to the method of the present invention.

A class tensor is a data representation of the detected or ascertained semantic classes in the image data to be processed. The class tensor may represent the result of the processing in the encoder path.

A decoder tensor is a data representation of the image data to be processed, which may be used as an input dataset for the decoder path of the artificial neural network, in particular, according to the convolutional neural network architecture.

A division function may be understood in the present case to mean any function which is suitable for selecting a suitable number from the input tensor and from the associated set of the feature maps. This may take place according to division functions, according to indices or the like.

A connection function may be understood in the present case to mean any function which is suitable for connecting the at least one first slice tensor to the at least one second slice tensor. This may take place via concatenation, summation, substitution, reproduction or the like.

The advantage of the method of the present invention is in the steps of the method, which are carried out in the transition area between the encoder path and the decoder path, i.e., in the discriminative path.

The application of the steps of the method may improve the accuracy of the localization without the effect of "gradient vanishing" occurring too strongly in the discriminative path.

"Gradient vanishing" is understood as the effect, which may occur when training artificial neural networks, that a change of the parameters may be vanishingly minimal. In the worst case, this effect results in a stagnation of the change or of the improvement of the trained parameters.

Furthermore, the application of the steps of the method is hardware independent. As a result, the method may be easily implemented both on embedded hardware (so-called embedded hardware) as well as on GPU clusters.

According to one specific embodiment of the method of the present invention, the division function in the step of dividing is configured in such a way that only a subset of the feature maps of the input tensor is selected for forming the at least one first slice tensor.

A feature map is understood in the present case to mean the output of a layer of an artificial neural network. In a CNN, this is typically the result of the processing by a convolutional layer, followed by the associated pooling layer and may be used as input data for the following layer or—if provided—for the fully connected layer.

According to one specific embodiment of the method of the present invention, the connection function (merge) in the step of connecting is configured in such a way that the dimension of the input tensor is maintained.

This specific embodiment has the advantage that with respect to the calculation resources to be used, it is possible to continue to use, with less use of resources and thus more favorably, pieces of information from various layers of the artificial neural network, in particular, of the convolutional neural network (CNN).

According to one specific embodiment of the method of the present invention, the method includes the preceding step of receiving, the input tensor and the division function being received in the step of receiving.

This specific embodiment of the method has the advantage that at lower costs the artificial neural network is more flexible compared to a parallel implementation of a conventional artificial neural network and is able to respond to the respective input tensors in a more fine-granular manner on the respective layers.

According to one specific embodiment of the method of the present invention, a first function of an artificial neural network is applied in the step of dividing to the at least one first slice tensor and a second function of an artificial neural network is applied to the at least one second slice tensor.

A function of an artificial neural network may be understood in the present case to be an arbitrary function of a neural layer of an artificial neural network. This may be convolution—also in the form of a convolutional block—i.e., a multiple application of convolutions, depth-wise convolution, squeeze, residual value (residual), density (dense), inception, activation (activation, act), normalization, pooling or the like.

Inception is understood in the present case to mean an architecture variation of an artificial neural network, in particular, of a convolutional neural network, as it was first described in Szegedy et al. Going deeper with convolutions. In Proceedings of the IEEE Conference on Computer Vision and Pattern Recognition, pp. 1-9, 2015.

According to one specific embodiment of the method of the present invention, the division function in the step of dividing is configured in such a way that the division function includes the number of feature maps to be calculated and the respective functions of an artificial neural network or calculation graphs for calculating the at least one first slice tensor and the at least one second slice tensor.

This specific embodiment of the method of the present invention has the advantage that different functions of an artificial neural network may be applied in a simple manner on the at least one first slice tensor and on the at least one second slice tensor. As a result, the artificial neural network becomes more flexible at lower costs compared to a parallel implementation of a conventional artificial neural network and the artificial neural network is able to respond to the respective input tensors in a more fine-granular manner.

Another aspect of the present invention is an artificial neural network for localizing and classifying image data, the artificial neural network including an encoder path for classifying the image data, a decoder path for localizing the image data. The encoder path in this case transitions into the decoder path. The transition takes place via a discriminative path. The network is configured in such a way that steps of the method according to the present invention are carried out in the discriminative path.

In one specific embodiment of the artificial neural network according to the present invention, the artificial neural network may be configured as a convolutional neural network.

Another aspect of the present invention is a device, which is configured to carry out steps of the method according to the present invention.

Another aspect of the present invention is a computer program, which is configured to carry out steps of the method according to the present invention.

Another aspect of the present invention is a machine-readable memory medium, on which the artificial neural network according to the present invention or the computer program according to the present invention is stored.

Details and specific embodiments of the present invention are explained in greater detail below with reference to the figures.

DETAILED DESCRIPTION

Figure 1:
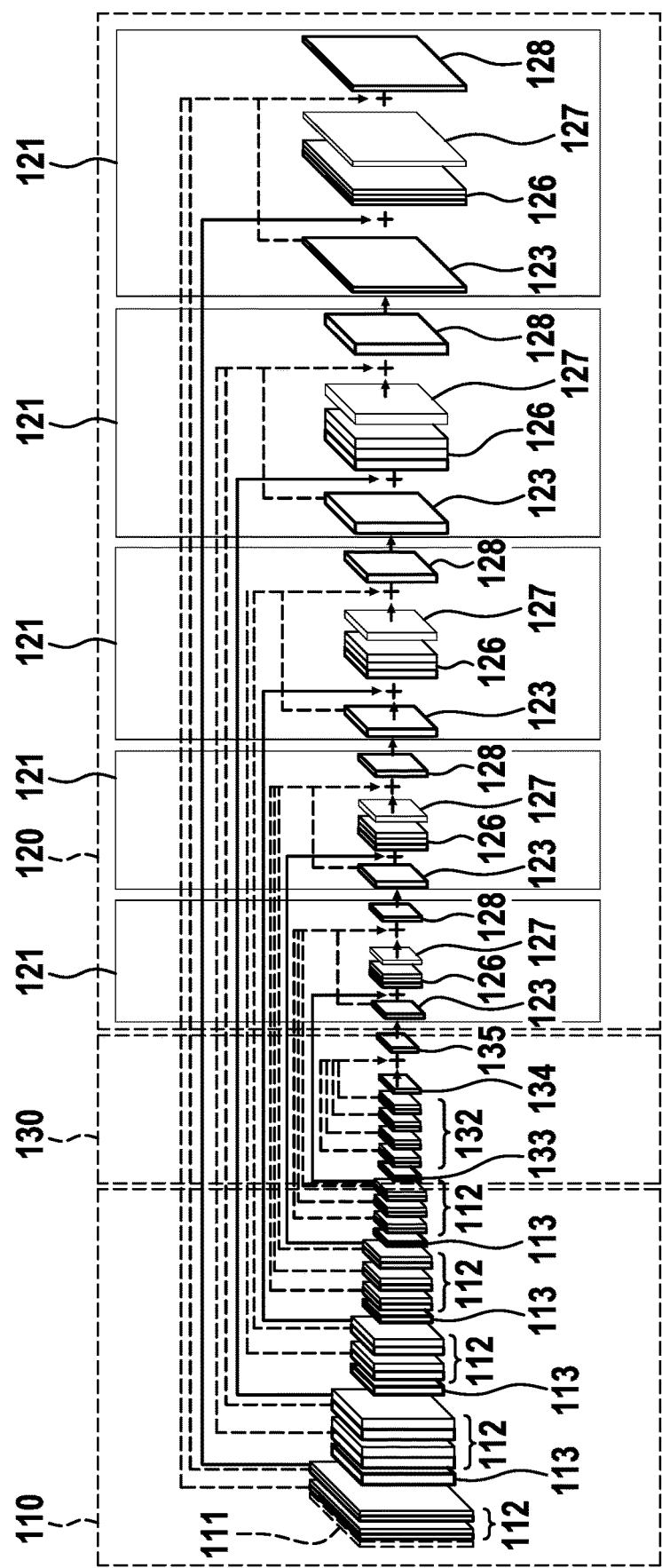
FIG. 1 shows a representation of a so-called fully convolutional network (FCN), in which the present invention is implemented.

FIG. 1 shows a representation of an artificial neural network according to the so-called fully convolutional network (FCN) architecture, in which the present invention is implemented.

The processing path for input data 111, which may be data of an imaging sensor, extends through the depicted artificial neural network from left to right.

The left part of the network represents encoder path 110. The right part of the network represents decoder path 120. Discriminative path 130 is located in the transition area between encoder path 110 and decoder path 120 at the deepest point of the network.

The application of division functions results in slice tensors 112 in encoder path 110, which are provided to decoder path 120. This is depicted by dashed and solid arrows.

Each layer ends or starts with the aid of an input tensor 113, which typically results from a consolidation step (pooling).

Discriminative path 130 also starts with an input tensor 133, which originates from encoder path 110. In the depicted network also via a consolidation step (pooling). In principle, it is conceivable that input tensor 133 is provided as input tensor 133 to discriminative path 130 from encoder path 110 via the application of another function of an artificial neural network.

Division functions are also applied to input tensor 133 in discriminative path 130 in order to obtain slice tensor 132. At least one class tensor 134 is subsequently generated by the application of functions of an artificial neural network.

This class tensor 134 is subsequently connected to at least one slice tensor 132 of discriminative path 130 by the application of at least one connection function in order to obtain a decoder tensor 135.

Decoder tensor 135 is subsequently provided to decoder path 120. There, decoder tensor 135 is initially converted up to an input tensor 123 of decoder path 120.

In the specific embodiment depicted, input tensor 123 is connected to at least one tensor of encoder path 110 by applying a connection function in order to obtain a concatenated tensor 126. In the specific embodiment depicted, it is the last encoder tensor of the corresponding layer of encoder path 110.

A layer is then considered to be corresponding if the resolutions of the tensors may be applied essentially correspondingly to one another, i.e. with no significant conversions.

At least one function of an artificial network may be applied to concatenated tensor 126 in order to obtain a correction tensor 127.

By applying at least one function of an artificial neural network in order to obtain a correction tensor 127, both coarse-granular features from encoder path 110 as well as fine-granular features from decoder path 120 are connected to one another.

Further on, correction tensor 127 is connected to slice tensor 112 of the corresponding layer of encoder path 110, so-called skip tensors, by applying at least one additional connection function in order to obtain a result tensor 128.

By applying a connection function, a refinement of input tensor 123 of decoder path 120 takes place with the aid of correction tensor 127.

Result tensor 128 is provided to the next highest layer in decoder path 120 as input tensor 123 of decoder path 120.

The steps applied in decoder path 120 are encompassed per layer with the aid of a box. The steps within the box form a so-called correction module 121.

With the correction module 121, both coarse-granular features from encoder path 110 as well as fine-granular features from decoder path 120 are connected to one another via the step of applying a function of an artificial neural network, in order to obtain a correction tensor 127. A refinement of concatenated tensor 126 further takes place with the aid of correction tensor 127 via the step of connecting correction tensor 127, in order to obtain a result tensor 128 or to generate an input tensor 123 of encoder path 120 for the next higher layer.

Figure 2:
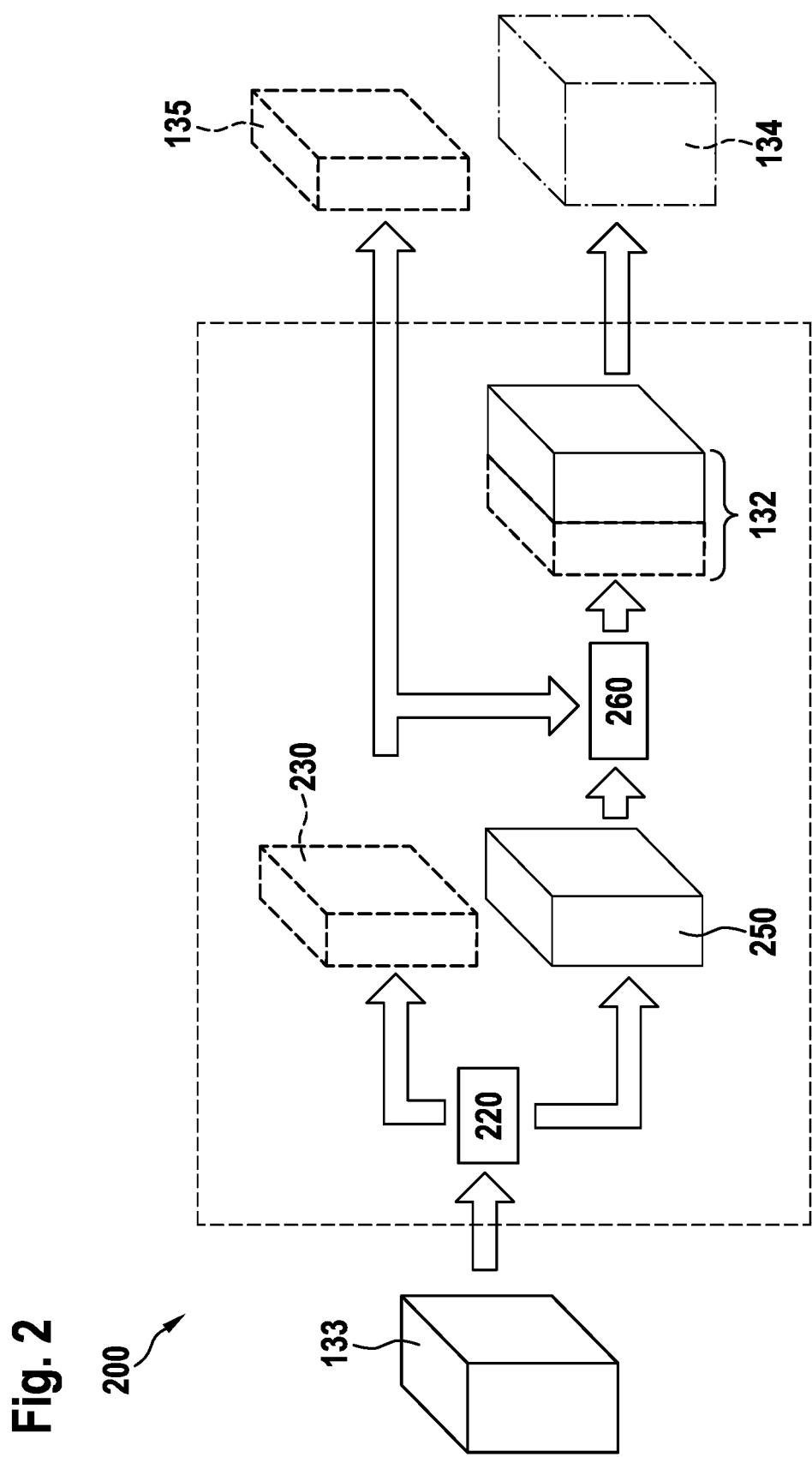
FIG. 2 shows a block diagram of a part of one specific embodiment of an artificial neural network according to the present invention.

FIG. 2 shows a block diagram of a part of a specific embodiment of an artificial neural network according to the present invention. According to this specific embodiment, the artificial neural network or the method according to the present invention is operated in a so-called "tensor mode" 200.

In the present case, an input tensor $x_i \in R^{n \times m \times f}$ 133 is depicted in discriminative path 130 having an n number of rows, an m number of columns and an f number of feature maps in the i-st step of an artificial neural network. A division function (slice) 220 is also present. Input tensor 133 is divided according to division function (slice) 220 into at last one first slice tensor 230 and into at least one second slice tensor 250. The division in this case may take place according to an arbitrary division function (slice) 220. Also conceivable are, among others, division according to division factors (splitting factor), according to indices or the like.

The at least one first slice tensor 230 is provided to be connected in the discriminative path with class tensor 134 to a decoder tensor 135 with the aid of a connection function, in order to be linked there with coarse, abstract feature representations.

The at least one second slice tensor 250, together with the at least one first slice tensor 230, is fed to a connection function (merge) 260 in order to generate a concatenated tensor 132. Any provision that is suitable for connecting first slice tensor 230 to second slice tensor 250 may be applied as a connection function (merge) 260. Concatenation, summation, substitution, replication or the like are, among others, conceivable.

Concatenated tensor 132 is provided in discriminative path 130 to be developed into a class tensor 134. The further development in this case may take place by the application of functions of an artificial neural network.

Figure 3:
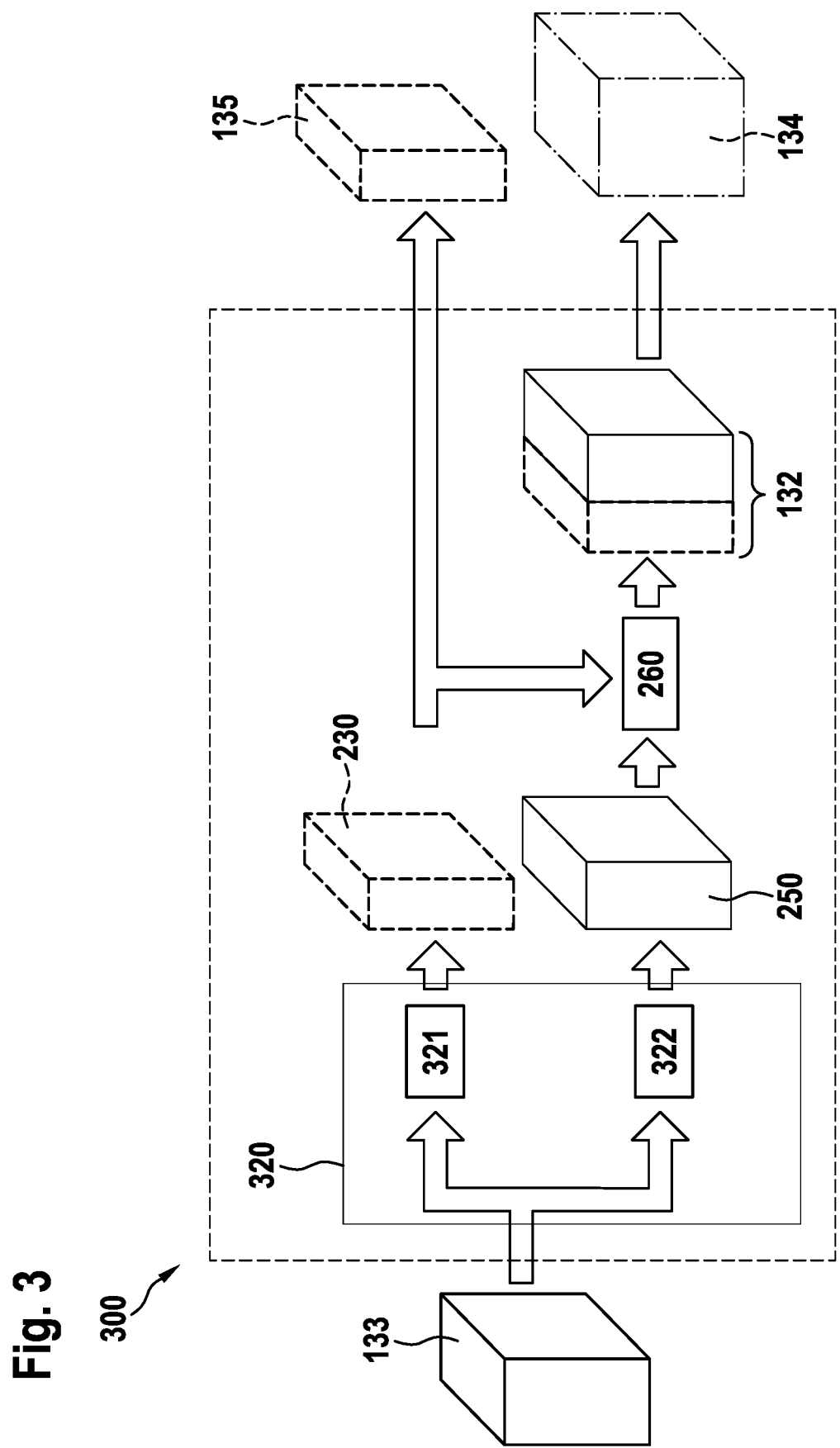
FIG. 3 shows a block diagram of a part of another specific embodiment of an artificial neural network according to the present invention.

FIG. 3 shows a block diagram of a portion of another specific embodiment of an artificial neural network according to the present invention. According to this specific embodiment, the neural network or the method according to the present invention is operated in a so-called "function mode" 300.

The input data of function mode 300 include, in addition to input tensor 133, also division function (slice) 320. Division function (slice) 320 is applied to input tensor 133 in order to obtain a first slice tensor 230 and a second slice tensor 250. In contrast to "tensor mode" 200, an arbitrary function of an artificial neural network 321, 322 is also applied to first slice tensor 230 and to second slice tensor 250. Convolution, residual value (residual), density (dense), inception, activation (activation, act), normalization, pooling or the like are, among others, conceivable. Different functions of an artificial neural network 321, 322 may be applied to first slice tensor 230 and to second slice tensor 250.

The at least one first slice tensor 230 is provided to be connected in the discriminative path with class tensor 134 to a decoder tensor 135 with the aid of a connection function, in order to be linked there with coarse, abstract feature representations.

The at least one second slice tensor 250, together with the at least one first slice tensor 230, is fed to a connection function (merge) 260 in order to generate a concatenated tensor 132. Any provision that is suitable for connecting first slice tensor 230 to second slice tensor 250 may be applied as a connection function (merge) 260. Concatenation, summation, substitution, replication or the like are, among others, conceivable.

Concatenated tensor 132 is provided to be developed into a class tensor 134 in discriminative path 130. The further development in this case may take place by the application of functions of an artificial neural network.

Figure 4:
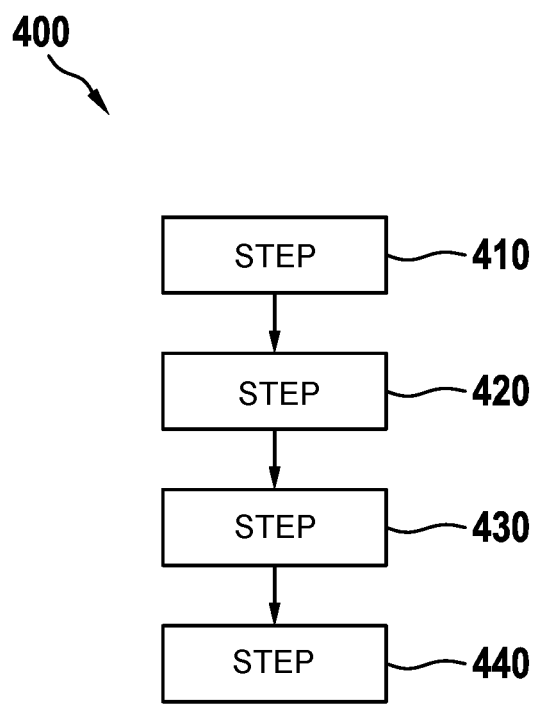
FIG. 4 shows a flow chart of the method according to the present invention.

FIG. 4 shows a flow chart of the method according to the present invention.

In step 410, input tensor 133 is divided into at least one first slice tensor 230 and at least one second slice tensor 250 as a function of a division function 220, 320, input tensor 133 originating from encoder path 110 of the artificial neural network.

This means that the input tensor may be a data representation of image data 111 to be processed after the processing in encoder path 110 of the artificial neural network.

In step 420, the at least one first slice tensor 230 is connected to the at least one second slice tensor 250 as a function of a first connection function 260 in order to generate a concatenated tensor 132.

The at least one concatenated tensor 132 is further developed in discriminative path 130 to form class tensor 134. The further development in this case may take place by the application of functions of an artificial neural network.

In step 430, the at least one first slice tensor 230 in the discriminative path with class tensor 134 is connected to a decoder tensor 135 with the aid of a second connection function.

In step 440, decoder tensor 135 is output to decoder path 120 of the artificial neural network in order to be processed further by the artificial neural network.

The present invention is suited for use in an automotive system, in particular, in conjunction with driver assistance systems up to and including semi-automated or fully automated driving.

Of particular interest in this case is the processing of image data or image streams, which represent the surroundings of a vehicle.

Such image data or image streams may be detected by imaging sensors of a vehicle. The detection in this case may take place with the aid of a single sensor. The merging of image data of multiple sensors, if necessary, of multiple sensors, with different detection sensors such as, for example, video sensors, radar sensors, ultrasonic sensors, LIDAR sensors, is also conceivable.

In this case, the ascertainment of free spaces (free space detection) and of the semantic distinction of foreground and background in the image data or image streams takes on particular importance.

These features may be ascertained by processing image data or image streams by the application of an artificial neural network according to the present invention. Based on this information, it is possible to activate the control system for the vehicle longitudinal control or lateral control accordingly, so that the vehicle responds appropriately to the detection of these features in the image data.

Another field of application of the present invention may be viewed as carrying out an accurate pre-labeling of image data or image data streams for a camera-based vehicle control system.

In this case, the labels to be assigned represent object classes that are to be detected in image data or in image streams.

The present invention is further useable in all fields, for example, automotive, robotics, health, monitoring, etc., which require an exact pixel-based object detection (pixel-wise prediction) with the aid of artificial neural networks. The following, for example, may be cited here: optical flow, depth from single image data, numbers, border detection, key cards, object detection, etc.

What is claimed is:

1. A method for providing calculation resource-saving semantic segmentation of image data of an imaging sensor with an artificial neural network, the method comprising:
performing the following in a discriminative path of the artificial neural network, which includes an encoder path, a decoder path, the encoder path transitioning into the decoder path, the transition taking place via the discriminative path:
dividing an input tensor as a function of a division function into at least one first slice tensor and at least one second slice tensor, the input tensor originating from the encoder path;
connecting the at least one first slice tensor to the at least one second slice tensor as a function of a first connection function to obtain at least one concatenated tensor;
connecting the at least one first slice tensor to a class tensor as a function of a second connection function to obtain a decoder tensor, the class tensor being of the at least one concatenated tensor; and outputting the decoder tensor to the decoder path of the neural network.

2. The method of claim 1, wherein the division function is configured so that only a subset of the feature maps of the input tensor is selected for forming the at least one first slice tensor.

3. The method of claim 1, wherein the first connection function and/or the second connection function is configured so that the dimension of the input tensor is maintained.

4. The method of claim 1, further comprising:
receiving the input tensor and the division function.

5. The method of claim 1, wherein in the dividing, a first function of a neural network is applied to the at least one first slice tensor and a second function of a neural network is applied to the at least one second slice tensor.

6. The method of claim 5, wherein the division function is configured so that it includes the number of feature maps to be calculated and the respective functions of an artificial neural network for calculating the at least one first slice tensor and the at least one second slice tensor.

7. The method of claim 1, wherein the concatenated tensor is configured to form a class tensor by applying functions of an artificial neural network.

8. A network for semantically segmenting image data of an imaging sensor, comprising:
an artificial neural network, including an encoder path, a decoder path, the encoder path transitioning into the decoder path, the transition taking place via a discriminative path, configured to perform the following in the discriminative path:
dividing an input tensor as a function of a division function into at least one first slice tensor and at least one second slice tensor, the input tensor originating from the encoder path;
connecting the at least one first slice tensor to the at least one second slice tensor as a function of a first connection function to obtain at least one concatenated tensor;
connecting the at least one first slice tensor to a class tensor as a function of a second connection function to obtain a decoder tensor, the class tensor being of the at least one concatenated tensor; and
outputting the decoder tensor to the decoder path of the neural network.

9. A device for semantically segmenting image data of an imaging sensor, comprising:
an artificial neural network, including an encoder path, a decoder path, the encoder path transitioning into the decoder path, the transition taking place via a discriminative path, configured to perform the following in the discriminative path:

dividing an input tensor as a function of a division function into at least one first slice tensor and at least one second slice tensor, the input tensor originating from the encoder path;
connecting the at least one first slice tensor to the at least one second slice tensor as a function of a first connection function to obtain at least one concatenated tensor;
connecting the at least one first slice tensor to a class tensor as a function of a second connection function to obtain a decoder tensor, the class tensor being of the at least one concatenated tensor; and
outputting the decoder tensor to the decoder path of the neural network.

10. A non-transitory computer readable medium having a computer program, which is executable by a processor, comprising:
a program code arrangement having program code for providing calculation resource-saving semantic segmentation of image data of an imaging sensor with an artificial neural network, by performing the following in a discriminative path of the artificial neural network, which includes an encoder path, a decoder path, the encoder path transitioning into the decoder path, the transition taking place via the discriminative path:
dividing an input tensor as a function of a division function into at least one first slice tensor and at least one second slice tensor, the input tensor originating from the encoder path;
connecting the at least one first slice tensor to the at least one second slice tensor as a function of a first connection function to obtain at least one concatenated tensor;
connecting the at least one first slice tensor to a class tensor as a function of a second connection function to obtain a decoder tensor, the class tensor being of the at least one concatenated tensor; and
outputting the decoder tensor to the decoder path of the neural network.

11. The computer readable medium of claim 10, wherein the division function is configured so that only a subset of the feature maps of the input tensor is selected for forming the at least one first slice tensor.

12. The computer readable medium of claim 10, wherein the artificial neural network includes a convolutional neural network.

13. The artificial neural network of claim 1, wherein the artificial neural network includes a convolutional neural network.

14. The network of claim 8, wherein the artificial neural network includes a convolutional neural network.

15. The device of claim 9, wherein the artificial neural network includes a convolutional neural network.

\* \* \* \* \*